United States Patent [19]

Thibodeau

[11] Patent Number: 5,518,081
[45] Date of Patent: May 21, 1996

[54] ALL-TERRAIN, ALL-WEATHER WHEELCHAIR

[76] Inventor: Bryan H. Thibodeau, RR. 4, 7469 Rosevear Road, Duncan, British Columbia, V9L 3W8, Canada

[21] Appl. No.: 93,432

[22] Filed: Jul. 15, 1993

[51] Int. Cl.⁶ .................................................. B62D 61/06
[52] U.S. Cl. ........................ 180/210; 180/907; 280/304.1; 280/250.1
[58] Field of Search ............................... 180/65.1, 65.5, 180/210, 215, 216, 907; 280/304.1, 250.1; 297/DIG. 10

[56] References Cited

U.S. PATENT DOCUMENTS

| | | | |
|---|---|---|---|
| 3,955,639 | 5/1976 | Cragg | 180/65.5 |
| 4,323,829 | 4/1982 | Witney et al. | 280/304.1 |
| 4,415,049 | 11/1983 | Wereb | 180/907 |
| 4,431,076 | 2/1984 | Simpson | 180/65.1 |
| 4,455,031 | 6/1984 | Hosaka | 180/907 X |
| 4,570,739 | 2/1986 | Kramer | 180/216 |
| 4,572,533 | 2/1986 | Ellis et al. | 280/304.1 |
| 4,574,901 | 3/1986 | Jopner | 280/304.1 X |
| 4,613,151 | 9/1986 | Kielczewski | 180/210 |
| 4,641,847 | 2/1987 | Busse | 280/242 |
| 4,790,548 | 12/1988 | Decelles et al. | 280/5.26 |
| 4,887,685 | 12/1989 | Shepard et al. | 180/209 |
| 4,892,166 | 1/1990 | Gaffney | 180/210 |
| 4,892,323 | 1/1990 | Oxford | 280/250.1 |
| 4,913,257 | 4/1990 | Janssen | 180/907 X |
| 4,926,777 | 5/1990 | Davis, Jr. | 114/220 |
| 4,934,723 | 6/1990 | Dysarz | 280/250.1 |
| 4,951,766 | 8/1990 | Basedow et al. | 280/304.1 |
| 4,953,645 | 9/1990 | Körber et al. | 180/6.5 |
| 5,011,175 | 8/1991 | Nicholson et al. | 280/304.1 |
| 5,044,647 | 9/1991 | Patterson | 280/304.1 |
| 5,145,020 | 9/1992 | Quintile et al. | 180/65.1 |
| 5,149,118 | 9/1992 | Oxford | 280/250.1 |
| 5,207,288 | 5/1993 | Ono | 180/65.5 X |
| 5,275,248 | 1/1994 | Finch et al. | 180/907 X |

FOREIGN PATENT DOCUMENTS

| | | |
|---|---|---|
| 0286742 | 10/1988 | European Pat. Off. . |
| 0339500 | 11/1989 | European Pat. Off. ............... 180/907 |
| 2061808 | 6/1971 | France . |
| 2222073 | 10/1974 | France . |
| 2522590 | 9/1983 | France . |
| 3150193 | 6/1983 | Germany . |
| 3244922 | 6/1984 | Germany . |
| 2120184 | 11/1983 | United Kingdom . |
| 8810109 | 12/1988 | WIPO . |
| 9301788 | 2/1993 | WIPO . |

Primary Examiner—Margaret A. Focarino
Assistant Examiner—Christopher Ellis
Attorney, Agent, or Firm—Christensen, O'Connor, Johnson & Kindness

[57] ABSTRACT

An all-terrain and all-weather wheelchair includes a frame and a seat and has drive wheels mounted to the rear of the frame independently rotatable and operable to both drive and steer the chair. A front wheel is pivotally mounted on the front of the frame and is free to rotate about an axis lying in its plane of rotation. Each of the rear wheels of the chair is independently mounted to the frame in such a manner as to provide for a predetermined amount of vertical movement of the wheels with respect to the frame. The suspension systems mounting the rear wheels to the frame are independent of one another and include a damping means to damp the vertical movement of the rear wheels. The seat is mounted to the frame in such a manner as to be hingedly attached at an upper end thereof so that the lower end of the seat can move between a first position in which it is adjacent the frame and a second position in which it is raised from the frame to assist in ingress and egress of a user from the chair. Also, the seat has its own suspension system to absorb the shock of travel over rough terrain. Preferably, the drive system includes a pair of DC motors independently drivingly affixed to each of the rear wheels and operable by a simple control panel. The drive motors are coupled to the wheels through a two- or three-speed gear box. The simplicity of the control panel allows easy interchangeability to accommodate pushbuttons, a joystick, an air-operated mouth-tube switch, a head-actuated switch, or any other type of electrical switch that is usable by someone having limited upper body strength and mobility.

29 Claims, 5 Drawing Sheets

ALL-TERRAIN, ALL-WEATHER WHEELCHAIR

FIELD OF THE INVENTION

This invention relates to wheelchairs and, more particularly, relates to a wheelchair intended for use "off-road." In particular, the wheelchair includes independent suspension systems for each of the wheels that permit the chair to maneuver safely over rocks, curbs, ruts and in sand, snow, dirt, and even shallow water and to operate in all weather conditions.

BACKGROUND OF THE INVENTION

Although motorized wheelchairs are well known in the prior art, the typical motorized wheelchair is simply a conventional wheelchair with a motor provided to drive the wheels. Typically, the motorized wheelchair has an electric motor powered by a battery. A typical wheelchair has a pair of small, freewheeling wheels at the front of the chair and a pair of larger, drive wheels at the rear of the chair. The drive wheels are typically very narrow gauged wheels, similar to bicycle wheels, and are mounted directly to the frame of the chair. There is no suspension system included to allow any vertical motion of the wheels relative to the frame of the chair and, therefore, the wheels do not do a very good job of absorbing shock from hitting objects, such as rocks or obstructions or curbs, or ruts in a dirt road. Also, the narrow gauge of the wheels makes it very difficult to maneuver the chair in soft road surfaces such as sand, gravel, snow, or mud. Therefore, while the typical motorized wheelchair works adequately in an urban environment traveling down sidewalks and crossing streets where there are curb cutouts, it does not do well in a rural environment or a wilderness environment where there were no paved roads or sidewalks.

As can be appreciated, it would be desirable for a motorized wheelchair to be suitable for use in "off-road" or rural environments. Such a wheelchair would have a suspension system for the wheels that absorbs the shock of striking objects or road hazards. Another desirable feature would be a seat lift to ease the entry and exit of the chair user from the chair seat and a suspension for the seat to ease jarring for persons with brittle bones. The motorized wheelchair should also be adaptable to many different types of control mechanisms.

SUMMARY OF THE INVENTION

To achieve the desirable characteristics stated above, an all-terrain wheelchair is provided that includes a frame and a front wheel rotatably mounted on a front end of the frame. The front wheel is pivotable about an axis that lies in the plane of the rotation of the front wheel. First and second rear wheels are rotatably mounted on a rear end of the frame and each of the first and second rear wheels is independently rotatable with respect to the other. A first suspension means is provided to mount the first rear wheel to the frame, the first suspension means being constructed and arranged to permit a predetermined amount of vertical movement of said first rear wheel relative to said frame. A second suspension means is provided for mounting the second rear wheel to the frame and is also constructed and arranged to permit a predetermined amount of vertical movement of the second rear wheel relative to the frame.

In one embodiment the front wheel of the all-terrain wheelchair has a front wheel suspension to provide a smoother ride. The front wheel is mounted with a reverse arcing suspension that allows the wheel to climb over obstructions such as curbs.

In a preferred embodiment the wheelchair is self-propelled and a drive means is mounted on a swing earm that is, in turn, suspended from the frame. The drive means is drivingly connected to each of the first and second rear wheels to propel the chair. In one embodiment of the chair the drive means includes a first drive motor drivingly connected to the first rear wheel and a second drive motor drivingly connected to the second rear wheel. The first and second drive motors are operable independently of one another and are used to steer the chair.

One embodiment of the all-terrain wheelchair includes a seat mounted on the frame and a seat lift means for moving the seat between a first and second position. An upper end of the seat is hingedly connected to the frame and the seat lift means is operable to pivotally move the seat between a first position in which a lower end of the seat is adjacent the frame and a second position in which the lower end of the seat is raised from the frame.

In the preferred embodiment the first and second drive motors are DC motors operated by a simple switch arrangement. The switch arrangement is included in a pushbutton panel or a joystick or could even be a mouth-operated air tube so that the chair can be used by persons having little or no mobility of their arms or hands.

BRIEF DESCRIPTION OF THE DRAWINGS

The objects and advantages of the present invention will be better understood by those of ordinary skill in the all and others upon reading the ensuing specification, when taken in conjunction with the appended drawings, wherein.

DETAILED DESCRIPTION OF THE PREFERRED EMBODIMENT

Figure 1:
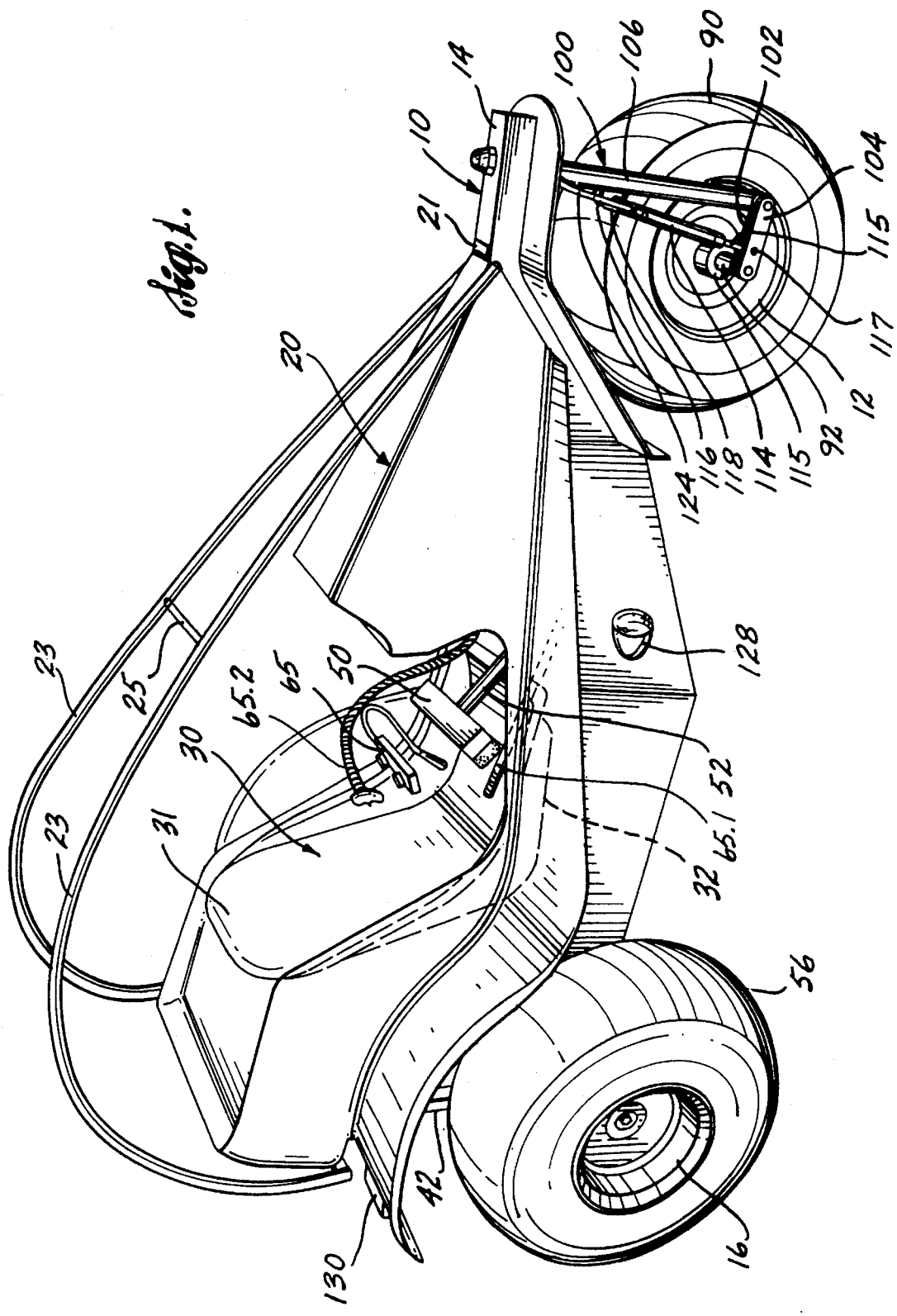
FIG. 1 is an isometric view of one embodiment of an all-terrain wheelchair made in accordance with the principles of the present invention.
Figure 2:
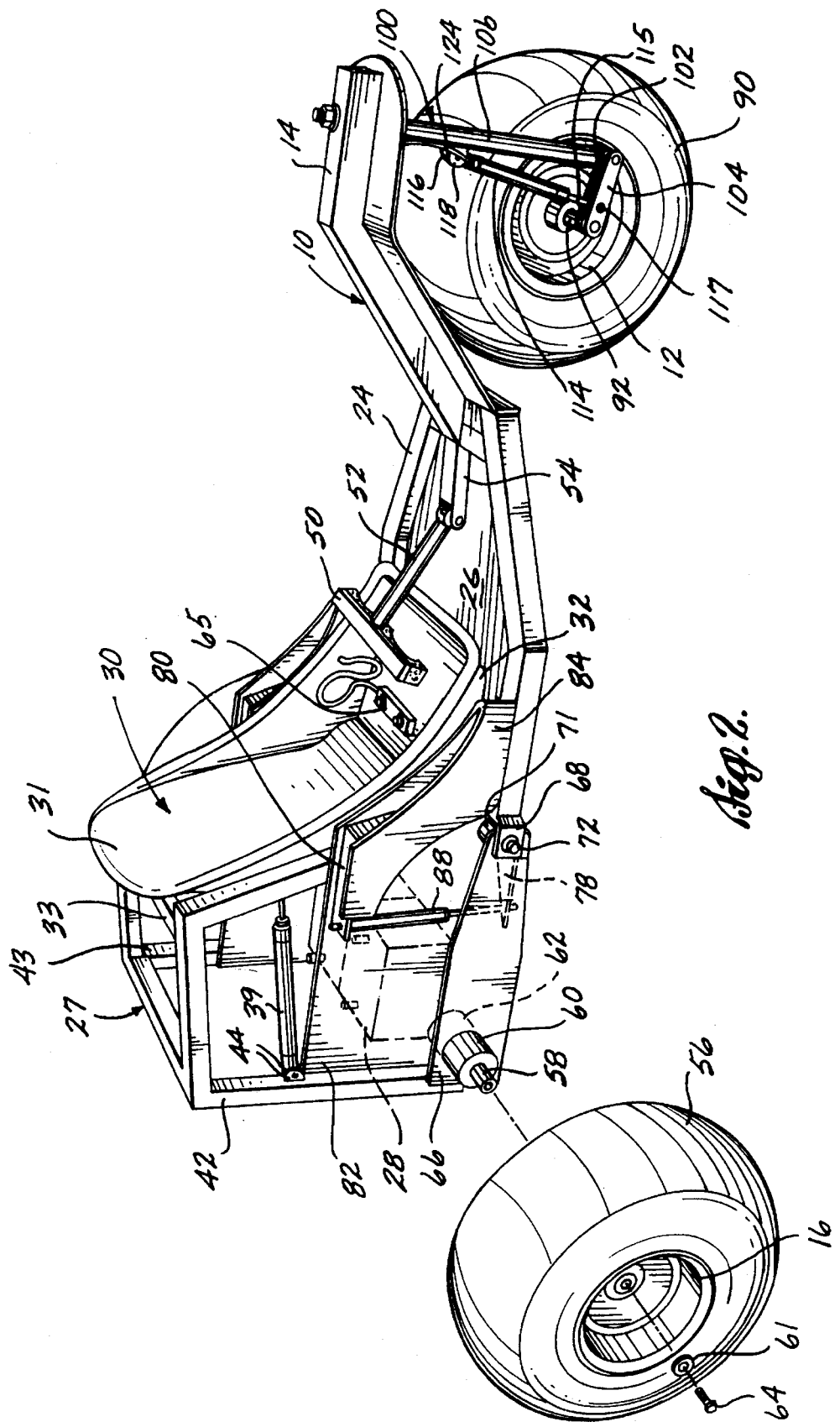
FIG. 2 is an isometric view of the frame assembly of the all-terrain wheelchair of FIG. 1 with a right wheel exploded from the frame.

One embodiment of an all-terrain wheelchair made in accordance with the principles of the present invention is shown in FIGS. 1 and 2. A frame 10 is constructed in a basic tricycle configuration with a front wheel 12 mounted on a front member 14 and two rear wheels 16 suspended from a rear portion of the frame 10. As shown in FIG. 1, preferably an aerodynamically designed body 20 is mounted on the frame. The body 20 is preferably made of a relatively lightweight, but durable, material, such as fiberglass or plastic, and has a substantially open cockpit configuration. The body 20 is hingedly connected to the frame by hinge means 21 located at the front end of the body 20 so that the body can be lifted from the frame to allow access to the seat. Preferably, a pair of brushguards 23 are also hingedly attached to the frame coincident with hinge means 21 and rise up and back over the cockpit area. The brushguards releasably attach to the rear of frame 10 and have a crossbrace 25 positioned to add stiffness. The frame 10 is best viewed in FIG. 2 and includes the previously identified front member 14, which holds the front wheel 12, and bottom frame members 22 and 24, which outline a floor panel 26. A rear cage assembly 27 includes a series of struts joined together to form a box-like configuration, which encloses the batteries 28 used to power the chair. The batteries are easily removable for ease of loading of the chair for transport. The batteries 28 sit on the floor panel 26 and are fastened down in a suitable fashion so that they do not jar loose during movement of the chair. A seat 30 is mounted on the frame just past the center of the frame toward the rear and the seat 30 coincides with the open portion of the body 20.

The seat 30 includes a seat back 31 and a seat bottom 32 and in the illustrated embodiment the seat back and bottom are molded together in a shape commonly known as a bucket seat. The upper end of seat back 31 is pivotally mounted to a crossmember 33 horizontally placed across the upper portion of the frame 10. FIGS. 1 and 2 show the seat 30 in its normal position. One leaf of a piano-type hinge 36 is affixed to the seat back 31. A second leaf of the piano-type hinge 36 is affixed to a stiffener bar 37. A first seat suspension air ram 41 has its lower end pinned by pin 45 between tabs 49 welded to left upright frame member 51. An upper end of an extendable rod 53 of air ram 41 is attached to one end of the stiffener bar 37. The other end of the stiffener bar 37 is attached to an extendable rod 55 that is part of a second seat suspension air ram 57. The lower end of air ram 57 is pinned by a pin 59 between tabs 63 welded to right upright frame member 67. The seat suspension air rams 41 and 57 preferably have about a two-inch stroke and act to absorb vertical shock to the seat as the chair moves over bumpy terrain. For further shock absorption a pair of shock-absorbing members 69 are affixed to the underside of seat bottom 32 so that they are between the seat bottom and floor panel 26 when the seat is in its normal use position. The members 69 are pictured as blocks of rubber or neoprene, but could also be springs.

Figure 3:
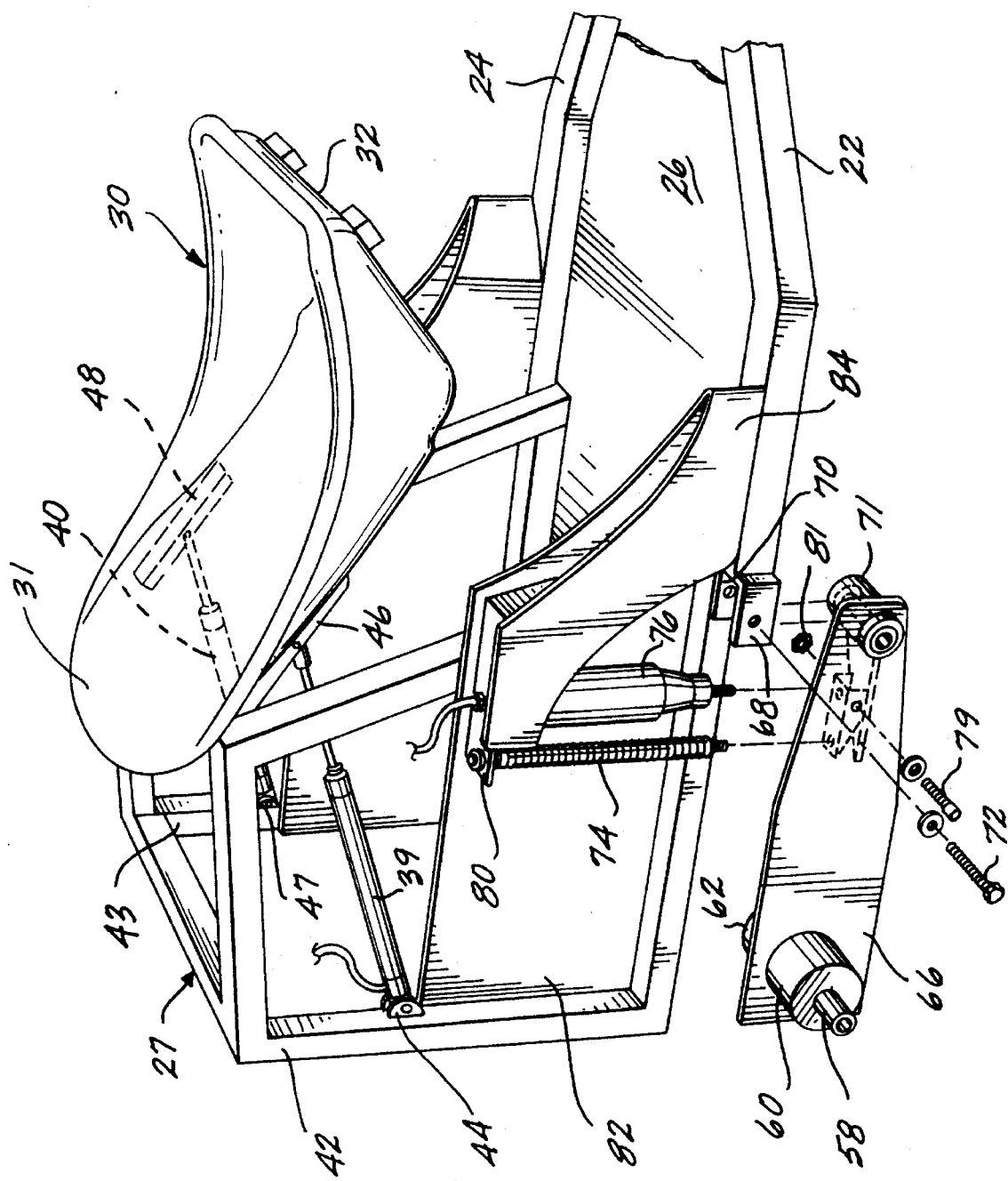
FIG. 3 is an isometric view of a portion of one embodiment of the wheelchair of the present invention showing the seat in a raised position and also showing one embodiment of the suspension system for the rear wheels.
Figure 4:
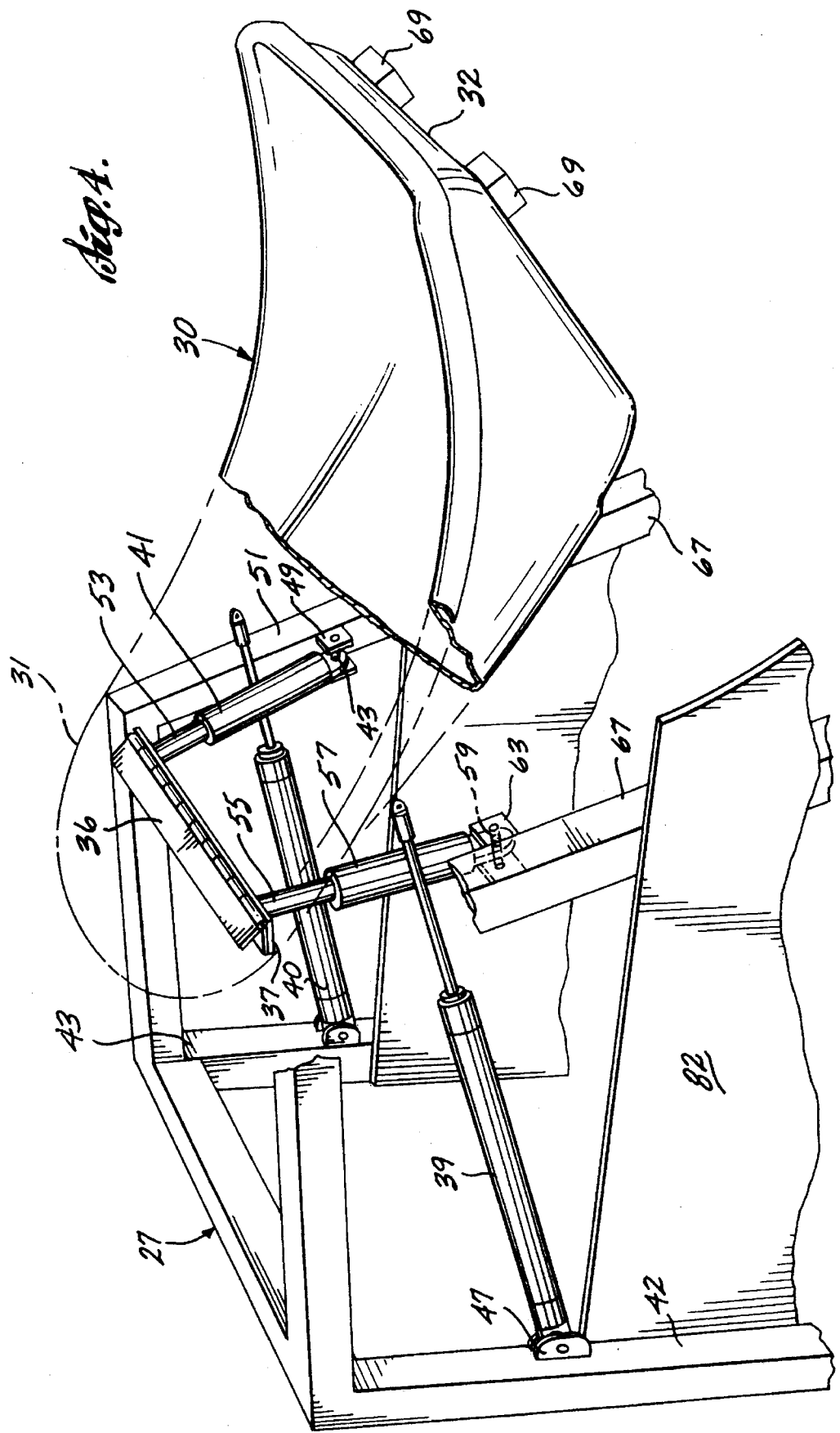
FIG. 4 is an isometric view of the seat mounting detail of the seat configuration shown in FIG. 3.

As can be seen best in FIGS. 3 and 4, the seat 30 is movable to a second position in which the seat bottom 32 is raised from the floor panel 26. In the raised position it is easier for a chair user to be placed into the seat 30 or lifted out of it by a companion or for the chair user to get into the seat or out of the seat by himself. A pair of air rams 39 and 40 are mounted between the seat back 31 and rear upright members 42 and 43 of the frame 10. More specifically, one end of the air ram 39 is pivotally mounted to a pair of ears 44 welded to the upright member 42 and one end of the extensible rod of air ram 39 is affixed to a reinforcing shut 46 attached vertically to the rear of the seat back 31. Similarly, the parallel-mounted air ram 40 is attached at its cylinder end to a pair of ears 47 welded to the upright member 43 and the end of the extensible rod of air ram 40 is attached to a second reinforcing strut 48 affixed to the seat back 31.

When the chair is in use the seat 30 will be in the position shown in FIGS. 1 and 2 and the extensible rods will not be fully retracted into the air rams 39 and 40. Even in the use position, there remains approximately 1½ inches of travel in the rams. When it is time for a user to exit the chair the air rams 39 and 40 can be energized to extend the extensible rods, pushing seat back 31 forward and pivoting it about the piano hinge 36 to raise the seat bottom 32 away from the floor panel 26 into the raised position. When the seat is in the raised position and a user sits in the seat, air pressure in the air rams 39 and 40 can be released, causing the extensible rods to retract into the cylinders under the weight of the person in the seat 30, thereby lowering the seat 30 to its lower position. The size of air rams 39 and 40 and the air pressure required to operate them will depend on whether the seat is intended to be used by a child or an adult, since the particular specifications for the air rams are clearly dependent upon the weight that needs to be moved, i.e., the weight of the user.

In the illustrated embodiment a holddown bar 50 is provided to engage the legs of a chair user to assist in maintaining the chair user in position in the seat. Typically, a seatbelt is also provided. The seatbelt is preferably of the full-harness type. The holddown bar 50 has two arcuate notches formed therein to coincide with the legs of the user. The holddown bar 50 is mounted on an arm 52, which in turn is pivotally mounted to a shut 54 affixed to the forward end of the frame 10 in the area where bottom frame members 22 and 24 come together. By pivoting the arm 52, the holddown bar 50 can be moved away from the legs of the user for ingress or egress to the chair and then pivoted back down to hold the legs of the user during use of the chair.

Rear wheels 16 on each side of the chair frame 10 are mounted in identical fashion and, therefore, the mounting of the right wheel will be described herein and it should be apparent to the reader that the left wheel is attached in an identical fashion on the other side of the frame. The wheel 16 preferably has a balloon-type pneumatic tire 56 mounted on its rim and inflated in the typical manner. The wheel 16 is mounted directly to the shaft 58 of a two- or three-speed gear box 60 mounted to the frame 10. The wheel 16 is held in place by a lock washer 61 and lock bolt 64 passes through the hole in the center of the hub of wheel 16 and into the shaft 58 of the gear box. The gear box is drivingly connected to a DC motor 62, which in turn is connected to the batteries 28. A standard electric brake is associated with the DC motor to provide braking action when the motor is not engaged. As discussed above, a similar arrangement is provided for the second rear wheel on the left side of the frame, which is attached to its own gear box and DC motor. The motors are operable independently of one another and by operating the motors in the desired sequence the chair is made to move forward and to turn right or left.

In the embodiment pictured in FIGS. 1 and 2 a pushbutton control 65 is wired to the batteries 28 and the DC motors 62 with pushbuttons to operate each of the DC motors independently of one another. It should be understood by those of skill in the art that, due to the relatively simple nature of the control required to operate the chair, it is possible to substitute other types of control panels for the pushbuttons. For example, a joystick 65.1 of the type used in a video game could be connected to allow movement of the chair by manipulation of the joystick in energizing the motors. Also, for those users of the chair who do not have any mobility in their arms or hands, it would be possible to utilize a mouth-tube-activated switch 65.2 of the type used on electric wheelchairs to permit the user to activate the motors in the desired sequence to propel the chair. The controls could also be of the head-actuated type. Preferably, the chair of the present invention has a wiring harness installed that permits the easy plug-in of any of the aforementioned types of control units so that the chair can be easily fitted to the physical capabilities of the user.

Referring again to the mounting of the wheel 16 to the frame 10, as shown in FIGS. 2 and 3, the wheel 16 is mounted to the gear box 60, which is in turn affixed to a suspension wing 66. The DC motor 62 is attached by supplying connection to the shaft of the gear box on the opposite side of suspension wing 66. The forward end of the suspension wing 66 is in turn pivotally mounted to a yoke formed in the bottom frame member 22. The yoke includes a first tab 68 and a second tab 70 that are parallel to one another and attached to the bottom frame member 22. A bearing assembly 71 is mounted in a hole formed in the forward end of the suspension wing 66 and the bearing assembly 71 is fitted between the tabs 68 and 70 of the yoke. A pin 72 mounted through the bearing assembly 71 and through the holes in the tab members 68 and 70 holds the bearing assembly 71 in place within the yoke and permits pivotal motion of the wing 66 about the pin 72. The movement of the wing 66 is restrained by a suspension system connected between the wing and the frame.

Illustrated in FIG. 3 is one embodiment of such a suspension system that comprises a coil spring 74 and an inflatable airbag 76. The lower ends of the coil spring 74 and the airbag 76 are affixed to a cam plate 77, which lies in a horizontal plane and is bolted to the inside surface of the suspension wing 66 by a bolt 79 that is held in place by a nut 81. The cam plate 77 can pivot about the bolt 79 to maintain the vertical geometry of the airbag 76 during movement of the wheel 16 and suspension wing 66. The upper ends of the spring 74 and the airbag 76 are affixed to an upper mounting plate 80 welded between an interior fender plate 82 affixed in a vertical plane to the bottom frame member 22 and a fender extension plate 84 that is attached at its bottom edge to the frame member 22 and welded at a forward end to the front end of the fender plate 82. The mounting is such that the upper end of the airbag 76 is rigidly affixed to the frame 10 while the lower end is affixed to the pivotable cam plate 77. The lower end of the spring 74 is fixed to the cam plate 77 and the upper end of the spring is allowed to move up and down to assist in shock absorption. As the wheel 16 and tire 56 encounter bumps or obstacles that cause the wheel to move in a vertical direction, the movement is absorbed by the suspension system of coil spring 74 and bag 76 and is not transmitted to the frame 10, thereby smoothing out the ride for the user and maintaining stability of the wheelchair. The airbag 76 also serves to damp any vertical motion of the wheel to prevent it from bouncing in some harmonic motion and causing damage to the chair parts. As discussed earlier, a similar arrangement is used to mount the wheel on the left side of the chair, each of the suspensions being independent of one another so that the wheels do not need to move in unison in a vertical direction, thereby again enhancing the stability of the chair, since the wheel on the right side of the chair can encounter an obstacle that is not encountered by the wheel on the left side of the chair and the motion of the wheel will be taken up in the suspension system rather than being transferred through the frame to the other wheel.

An alternate embodiment of the suspension system is shown in FIG. 2. In FIG. 2 the movement of the wing 66 is monitored and damped by a shock absorber 88 of the type used in automobiles. One end of the shock absorber is mounted to the upper mounting plate 80 while the end of the extensible arm of the shock absorber is attached to a triangular mounting plate 78, which in turn is affixed to the suspension wing 66. Typically, the same type of suspension system is used, on both the right and left rear wheels and matched so that the suspension flexibility is the same for both wheels.

Figure 5:
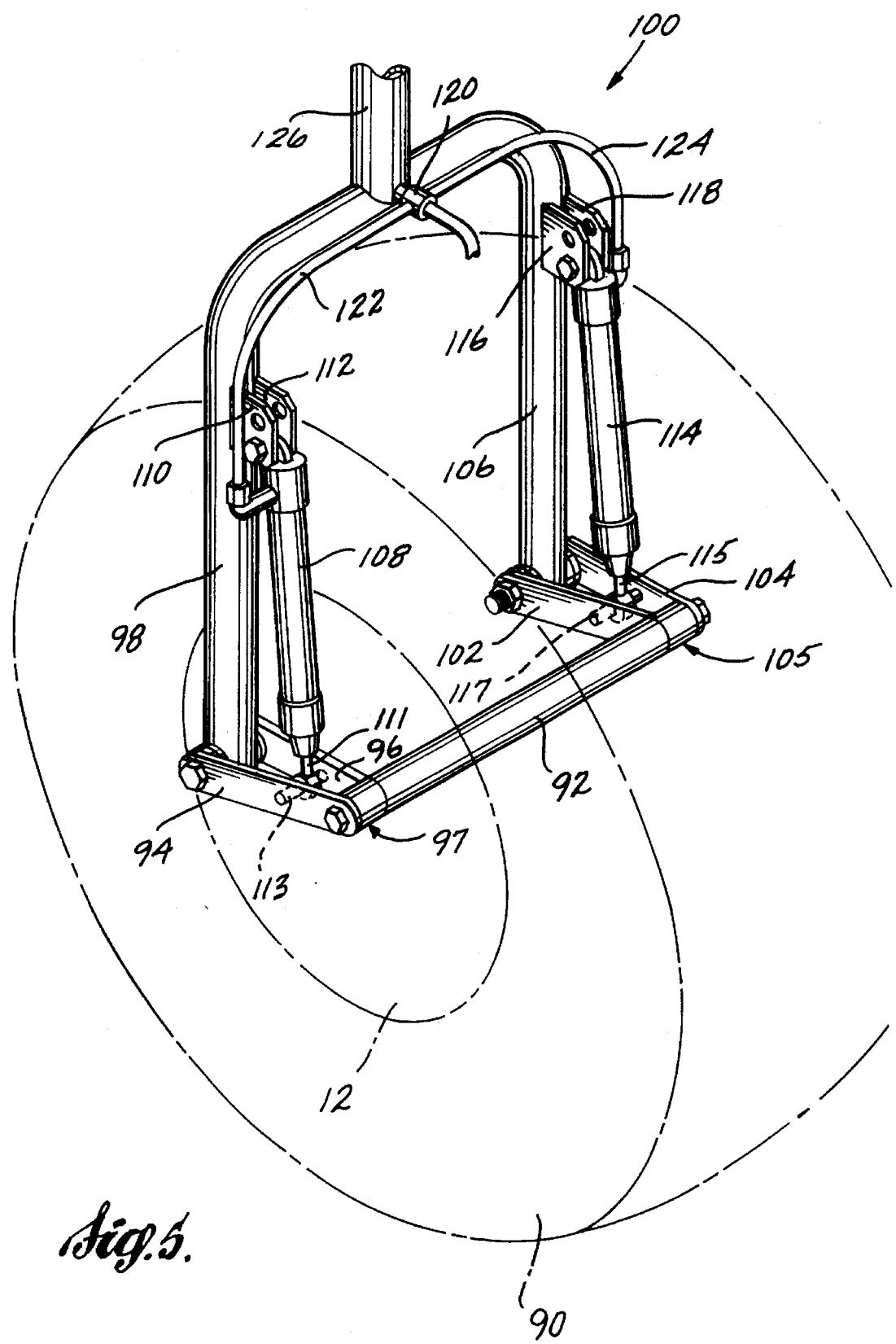
FIG. 5 is an isometric view of the front fork assembly of the wheelchair of FIGS. 1 and 2 showing the collapsed suspension system for the front wheel of the wheelchair.

FIG. 5 illustrates the mounting of the front wheel of the illustrated embodiment of the all-terrain wheelchair of the present invention. The front wheel 12, similar to the rear wheels 16, has a balloon-type pneumatic tire 90 mounted on its rim. The wheel 12 is rotatably mounted between the fork tubes of a front fork assembly 100. An axle 92 passes through the center of the wheel 12 and the wheel 12 rotates about the axle 92. A first end of the axle 92 is mounted to the ends of arms 94 and 96 that make up an integral suspension yoke 97 and the opposite end of the suspension yoke is pivotally mounted to a first fork tube 98 of the front fork assembly 100. A second end of the axle 92 is mounted to the ends of arms 102 and 104 that make up another integral suspension yoke 105 and the other end of the yoke is pivotally mounted to a second fork tube 106 of the front fork assembly 100. A first air shock absorber 108 is mounted between the arms 94 and 96 and a pair of flanges 110 and 112 are welded to the first fork tube 98. An end of an extensible rod 111, which extends from the cylinder of the air shock 108, is pivotally mounted to a pin 113 that extends between the arms 94 and 96 and is affixed to them. Similarly, a second air shock 114 has a first end of its cylinder affixed to a pair of tabs 116 and 118 welded to the second fork tube 106 and an end of its extensible arm 115 pivotally mounted on a pin 117 affixed between the arms 102 and 104. As the chair moves across a road surface the front wheel 12 is permitted to move in a vertical direction by pivotal motion of the yoke 97 and the yoke 105 about their attachment points to the front fork tubes 98 and 106. Therefore, as the wheel 12 encounters obstacles, it will move in a vertical direction to rise over such obstacles. The vertical motion of the front wheel 12 is damped by the air shock absorbers 108 and 114 mounted between the yoke arms and the upper ends of the front fork tubes 98 and 106. An air fitting 120 is affixed to the upper end of the front fork assembly and has a first fill tube 122 running from the fitting 120 to the cylinder of air shock 108 and a second fill tube 124 connected between the fitting 120 and the upper end of the cylinder of air shock 114. A source of compressed air can be attached to the fitting 120 in order to provide compressed air to the shock absorbers 108 and 114 to adjust the stiffness of the shock absorbers. The front suspension of the chair can be adjusted to accommodate the weight of the particular user of the chair or to obtain preferred ride smoothness, for example, for persons with brittle-bone disease.

The front fork assembly 100 also includes an upright mounting tube 126 that is welded at its bottom end to the fork tubes 98 and 106 at their point of union. The upper end of mounting tube 126 is mounted in a bearing at the forward end of front member 14. The front fork assembly and therefore the front wheel 12 are rotatable about an axis defined by the upright mounting tube 126.

A preferred embodiment of the chair has headlights 128 affixed to the body 20 forward of and below the cockpit area and tail lights 130 attached to the rear fender portion of the body 20 to permit the chair to be used at night and in inclement weather with limited visibility. It is clear from the above disclosure that an all-terrain wheelchair is described that includes independent suspension for each of the rear wheels and the front wheel in a three-wheel arrangement to enable the chair to easily pass over obstacles in its path while maintaining stability of the chair. The chair also includes a seat that is movable between two positions, depending on whether the seat is in the use position or the ingress/egress position for a user of the chair. The seat also includes a suspension system that smoothes the ride of the wheelchair in addition to the action of the wheel suspension. Preferably, the chair is powered by DC motors independently connected to each of the rear wheels and controlled by the user. The simplicity of the drive system permits a simple control panel to be used to control the movement of the chair and the controls are wired such that the type of control panel is interchangeable between, for example, push-buttons, a joystick, a mouth-operated air switch or any other type of electric switch that can be used by those who have limited mobility in their upper body. It should be understood by those of ordinary skill in the an and others that the embodiment of the invention illustrated and described herein is exemplary only and that changes can be made to the illustrated embodiment while remaining within the scope of the present invention. Therefore, the invention should be defined only by the scope of the claims appended hereto.

The embodiments of the invention in which an exclusive property or privilege is claimed are defined as follows:

1. An all-terrain, all-weather wheelchair including:
   a frame;
   a front wheel rotatably mounted on a front end of said frame to rotate about a first axis;
   a front suspension means for mounting said front wheel to said frame to pivot about a pivot axis to permit a predetermined amount of vertical movement of said front wheel relative to said frame;
   first and second rear wheels rotatably mounted on a rear end of said frame to rotate about a second axis, each of said first and second rear wheels independently rotatable with respect to the other;
   first suspension means for mounting said first rear wheel to said frame to pivot about a pivot axis, said suspension means constructed and arranged to permit a predetermined mount of vertical movement of said first rear wheel relative to said frame;
   second suspension means for mounting said second rear wheel to said frame to pivot about a pivot axis, said second suspension means constructed and arranged to permit a predetermined amount of vertical movement of said second rear wheel relative to said frame;
   a seat mounted on said frame including a bottom portion and a back portion, the bottom portion of said seat being mounted to be positionable at approximately the same elevation as the elevation of a plane defined by the pivot axis of said front wheel and the pivot axes of said first and second rear wheels thereby providing said wheelchair with a low center of gravity;
   drive means mounted on said frame and drivingly connected to at least one of said first and second rear wheels for propelling said wheelchair; and
   a disabled steering and propulsion controller operable by a person having limited upper body mobility for controlling said drive means and for steering said wheelchair.

2. The wheelchair of claim 1, wherein said drive means includes:
   a first drive motor drivingly connected to said first rear wheel and a second drive motor drivingly connected to said second rear wheel, said first and second drive motors operable independently of one another.

3. The wheelchair of claim 1, wherein said first suspension system includes a damping means for damping the motion between said first drive wheel and said frame.

4. The wheelchair of claim 3, wherein said second suspension system includes a damping means for damping the motion between said second drive wheel and said frame.

5. The wheelchair of claim 4, wherein said first and second damping means comprise springs mounted between said drive wheels and said frame.

6. The wheelchair of claim 4, wherein said first and second damping means comprise airbags fillable with compressed fluid mounted between said drive wheels and said frame.

7. The wheelchair of claim 4, wherein said first and second damping means comprise shock absorbers mounted between said drive wheels and said frame.

8. The wheelchair of claim 1, said seat being movable between a first position in which the bottom portion of said seat is adjacent said frame and a second position in which said bottom portion end of said seat is raised from said frame.

9. The wheelchair of claim 8, further including a seat lift means operable to move said seat between said first and second positions.

10. The wheelchair of claim 9, wherein said seat lift means comprises at least one air ram connected between said seat and said frame.

11. The wheelchair of claim 9, wherein said seat lift means comprises a pair of air rams connected in parallel between said frame and said seat and operable together to move said seat between said first and second positions.

12. The wheelchair of claim 2, wherein said controller is connected to said drive motors and operable to energize each of said drive motors as required to propel and steer said chair.

13. The wheelchair of claim 12, wherein said controller comprises a joystick.

14. The wheelchair of claim 12, wherein said controller comprises a first and second pushbutton, each operable to energize one of said first or second drive motors to steer said chair.

15. The wheelchair of claim 12, wherein said controller comprises a connector means suitable for receiving a human-operated control panel chosen from any of the group of joystick, pushbuttons, or a mouth-tube switch.

16. The wheelchair of claim 1, wherein said front suspension means includes at least one air ram mounted between said front wheel and said frame.

17. The wheelchair of claim 9, further including a seat suspension means separate from said seat lift means for mounting said seat to said frame, said seat suspension means permitting a predetermined amount of vertical movement of the entire seat with respect to said frame.

18. The wheelchair of claim 17, wherein said seat suspension means includes:
   a hinge having a first plate and a second plate hingedly attached to one another, said first plate of said hinge being affixed to a rear surface of the first end of said seat; and
   first and second air rams, each including a cylinder and a rod extendably mounted within said cylinder, a first end of said extensible rod of said first air ram attached to a first end of said second plate of said hinge and a first end of said extensible rod of said second air ram being attached to a second end of said second plate of said hinge, first ends of said cylinders of said first and second air rams being attached to said frame.

19. The wheelchair of claim 17, further including:
   shock-absorbing means attached to a bottom surface of said second end of said seat and constructed and arranged so that when said seat is in its first position said second end of said seat is supported on said frame by said shock-absorbing means.

20. The wheelchair of claim 19, wherein said shock-absorbing means comprises at least one block of resilient material.

21. The wheelchair of claim 19, wherein said shock-absorbing means comprises at least one spring.

22. The wheelchair of claim 17, wherein said seat suspension means and said seat lift means are adjustable to the weight of the user of the wheelchair.

23. The wheelchair of claim 1, further including a body mounted on said frame and shaped to enclose at least the lower limbs and lower torso of the user of the wheelchair.

24. The wheelchair of claim 23, wherein said body is shaped to further enclose the portion of the frame behind the user of the wheelchair.

25. The wheelchair of claim 23, wherein said body is hingedly attached to said frame so that said body can be pivoted to a position allowing egress of the user from the chair.

26. The wheelchair of claim 17, wherein said seat lift means also acts as a shock absorber to permit damped motion of said seat in a horizontal direction.

27. The wheelchair of claim 1, wherein said first suspension system includes a first suspension wing pivotally mounted at a first end to said frame, said first rear wheel rotatably mounted to a second end of said first suspension wing; and a first inflatable airbag suspension unit having a first end attached to said frame and a second end attached to said first suspension wing at a point between said first rear wheel and the first end of said first suspension wing, and wherein further said second suspension means includes a second suspension wing pivotally mounted at a first end to said frame, said second rear wheel rotatably mounted to a second end of said second suspension wing, and a second inflatable airbag suspension unit, having a first end attached to said frame and a second end attached to said second suspension wing at a point between the second rear wheel and said first end of said second suspension wing.

28. The wheelchair of claim 1, wherein said front wheel is pivotable about a vertical axis offset from the rotational axis of said wheel.

29. The wheelchair of claim 28, further including a front fork assembly having a first member pivotally attached at an upper end to said frame, a pair of fork members extending from the lower end of said first member, said front wheel being mounted within the space between said fork members, the lower ends of said fork members respectively having first and second trailing arm members pivotally attached thereto, the second ends of said trailing arm members having an axle journaled therein, said axle passing through and rotatably mounting said front wheel to said fork assembly; and first and second adjustable shock absorbers, including a cylinder portion attached to said front fork member and extendable rods mounted within said cylinder portions, each of said rods attached to said trailing arms at a point between the axle and the lower end of the fork members.

* * * * *

UNITED STATES PATENT AND TRADEMARK OFFICE
CERTIFICATE OF CORRECTION

PATENT NO. : 5,518,081
DATED : May 21, 1996
INVENTOR(S) : B.H. Thibodeau

It is certified that error appears in the above-indentified patent and that said Letters Patent is hereby corrected as shown below:

COLUMN        LINE

7                 31              "mount" should read --amount--
(Claim 1,         line 16)

8                 35              Before "joystick" insert --a--
(Claim 15,        line 4)

Signed and Sealed this

Eighth Day of October, 1996

Attest:

BRUCE LEHMAN

*Attesting Officer*                     *Commissioner of Patents and Trademarks*